Figure 1:
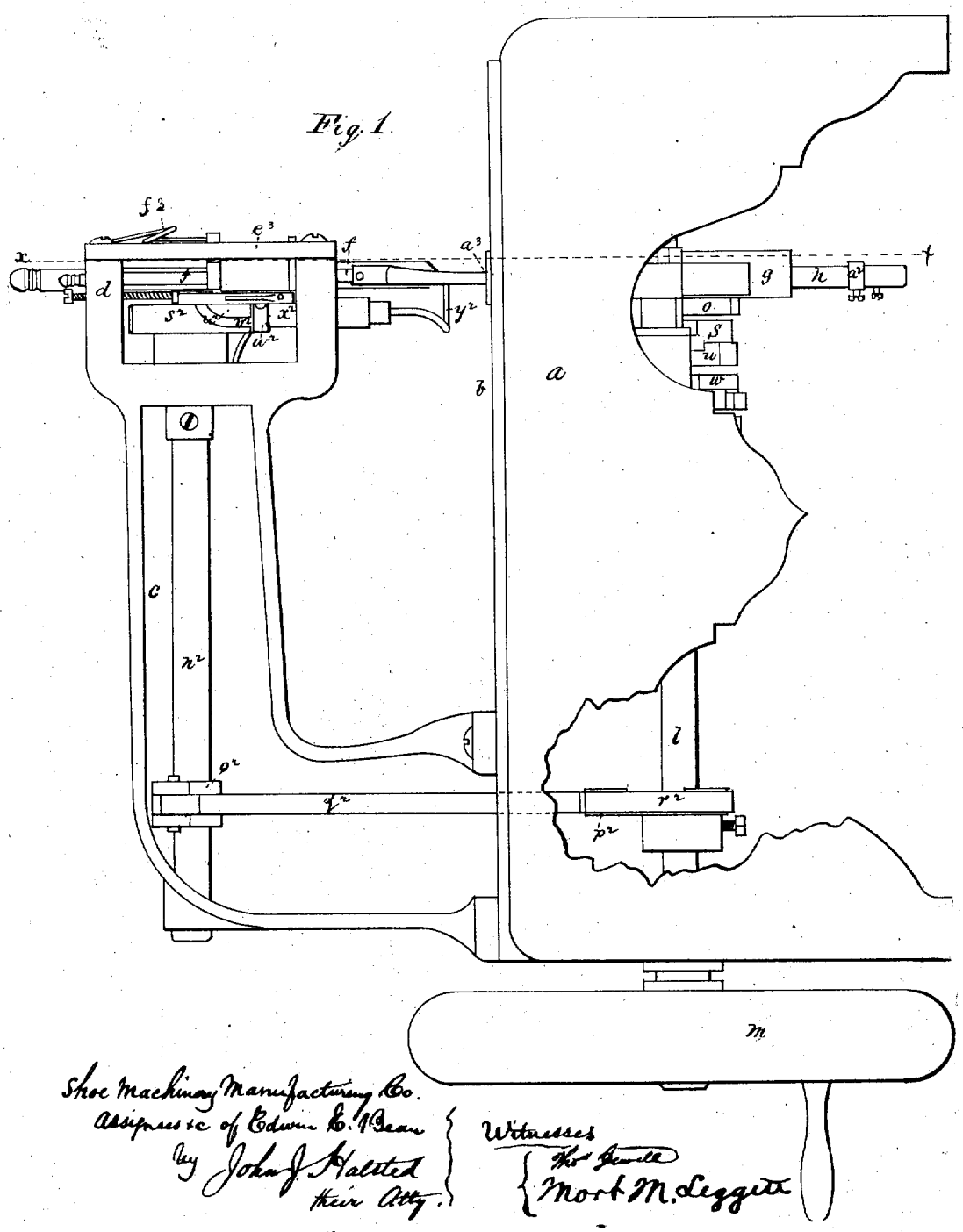

3 Sheets--Sheet 1.

E. E. BEAN.

Wax-Thread Sewing-Machines.

No. 5,423. Reissued May 27, 1873.

Shoe Machinery Manufacturing Co.
Assignees &c of Edwin E. Bean
by John J. Halsted
their Atty.

Witnesses
Thos Jewell
Mort M. Leggett

3 Sheets--Sheet 2.

E. E. BEAN.

Wax-Thread Sewing-Machines.

No. 5,423. Reissued May 27, 1873.

Witnesses. { Thos Jewell
Mort M. Liggitt.

Shoe Machinery Manufacturing Co
assignees &c. of Edwin E. Bean
by John J. Halsted, their Atty 3 Sheets--Sheet 3.
E. E. BEAN.
Wax-Thread Sewing-Machines.
No. 5,423. Reissued May 27, 1873.
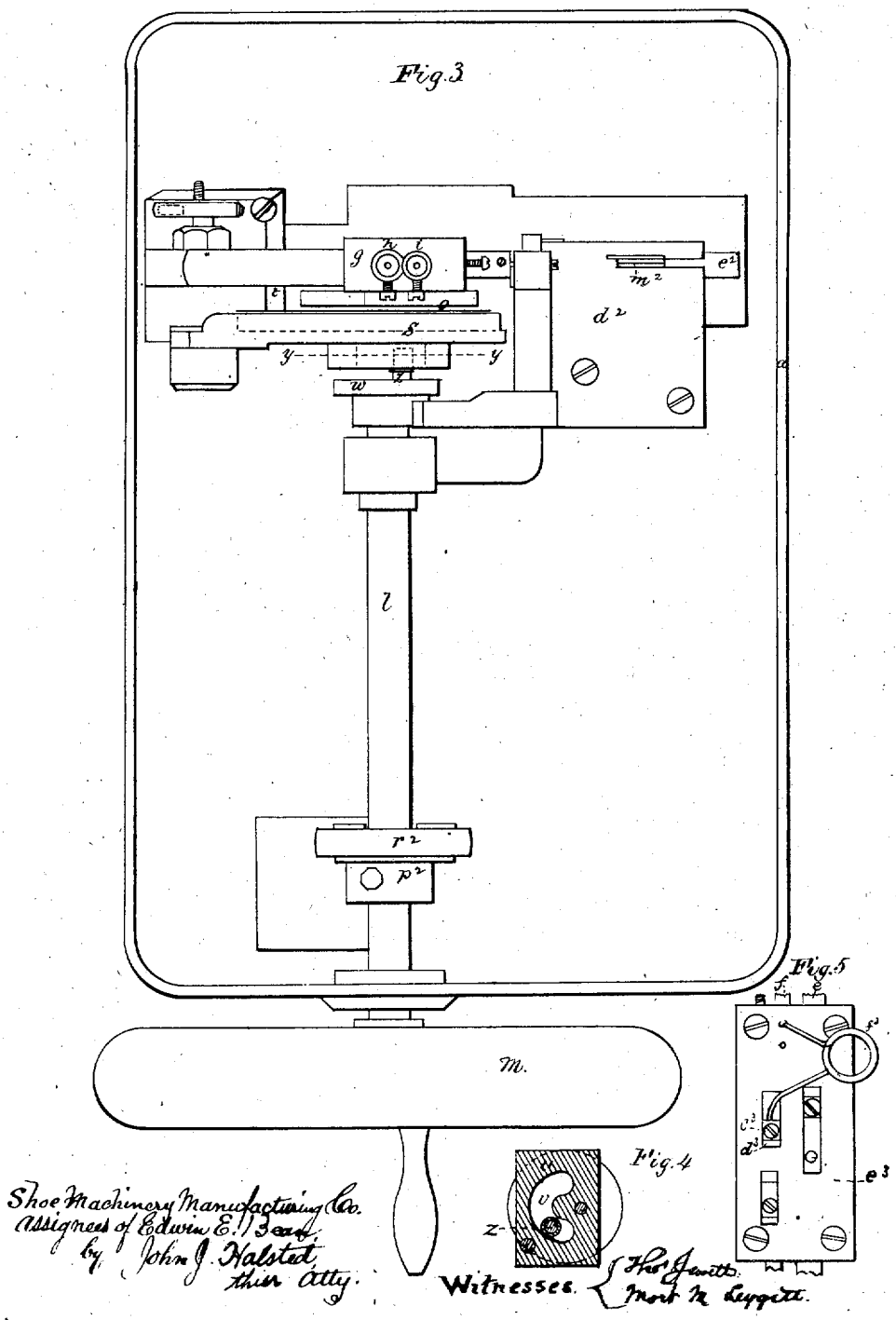
Shoe Machinery Manufacturing Co.
Assignees of Edwin E. Bean
by John J. Halsted
their Atty.
Witnesses. { Thos. Jewitt.
Mort. M. Leggett.

UNITED STATES PATENT OFFICE.

EDWIN E. BEAN, OF ABINGTON, ASSIGNOR, BY MESNE ASSIGNMENTS, TO THE SHOE-MACHINERY MANUFACTURING COMPANY, OF BOSTON, MASS.

IMPROVEMENT IN WAX-THREAD SEWING-MACHINES.

Specification forming part of Letters Patent No. 51,383, dated December 5, 1865; reissue No. 5,423, dated May 27, 1873; application filed February 20, 1873.

*To all whom it may concern:*

Be it known that I, EDWIN E. BEAN, of Abington, in the county of Plymouth and State of Massachusetts, have invented certain Improvements in Waxed-Thread Chain-Stitch Sewing-Machines, of which the following is a specification:

In the manufacture of what are now generally known as wax-thread sewing-machines, or machines in which the stitch is a single-thread chain-stitch, formed by a hook-needle, a thread-guide and cast-off, operating in combination with a suitable feed mechanism and a suitable work-supporting surface, an awl is used in connection with the needle, such awl working from one side of the work-supporting plate, and the needle from the opposite side thereof. In such machines, as generally organized, the needle-bar is below the work-supporting plate, and is reciprocated vertically by mechanism below such plate, while the awl-bar is above the work-supporting plate, and is reciprocated by mechanism above the plate, such organization effecting a line of stitches in which the fair side is uppermost, and the awl-puncturing holes in which any burrs made by the awl project from the opposite or lower side of the work, leaving the fair-stitch side unmarred. It is to the organization of such a machine that this invention relates. In most such machines the shaft that operates the needle mechanism is below the work-support, and the awl is worked by a long lever-connection extending from the awl-bar to a cam on the driving-shaft, this lever being pivoted in the goose-neck. Such lever-connection is on many accounts objectionable, and one part of this invention relates to an organization in which the awl-bar is worked through the medium of a horizontal shaft, mounted in bearings in the overhanging arm or goose-neck, at the front end of which is the head in which the awl-bar slides, such shaft for operating the awl-bar co-operating of course with the mechanism that operates the needle-bar, both bars receiving their respective movements from the driving-shaft.

In the machine shown in the accompanying drawing a horizontal shaft is shown for working the needle-bar; and one part of my invention consists in combining shafts above and below the plane of the work-supporting plate, operating, by means substantially as hereinafter described, to effect the respective movements of the awl and needle bars. The upper shaft of the machine shown in the drawing effects not only the movements of the awl-bar but those of the presser-foot and those of the thread-guide, and another part of my invention consists in effecting, from the same horizontal shaft that works the awl-bar, the movement of the presser-foot.

The drawing represents a machine embodying the invention.

Figure 2:
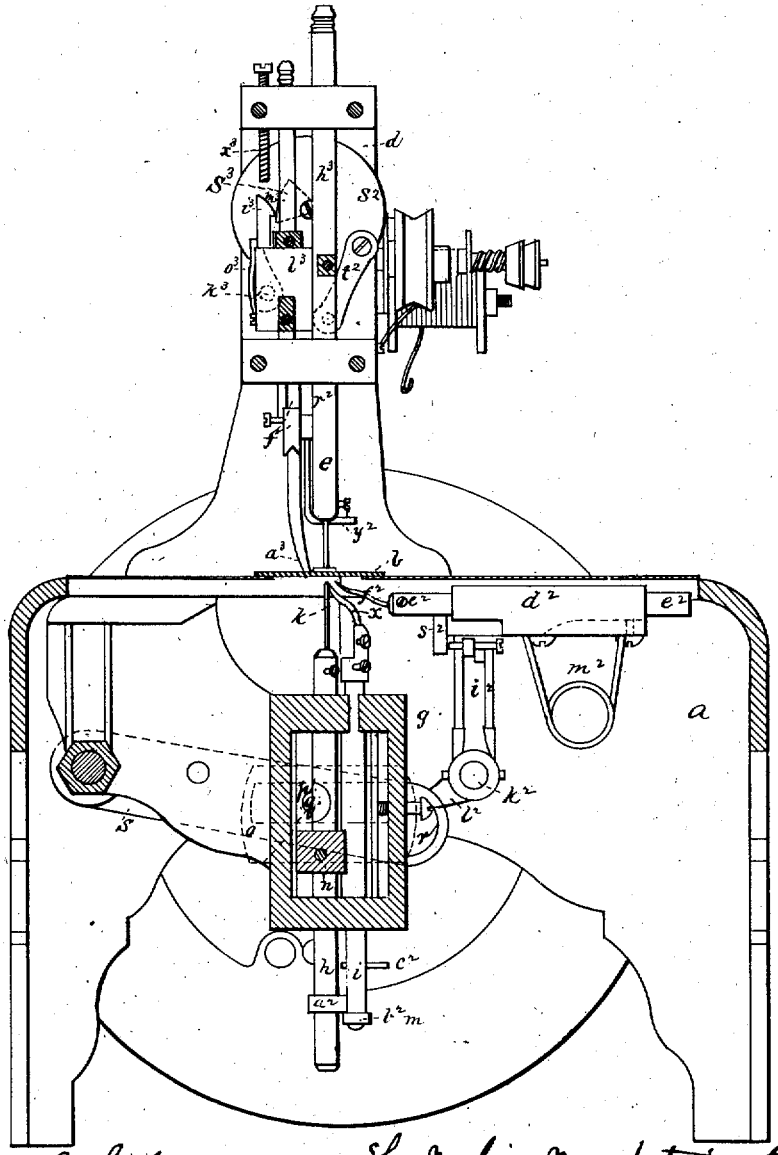

Figure 1 shows the machine in side elevation. Fig. 2 is a vertical section taken on the line *x x*. Fig. 3 is a reversed plan of the machine. Fig. 4 is a section on the line *y y* of Fig. 3.

*a* denotes the frame; *b*, the work-supporting plate; *c*, the goose-neck or overhanging arm, at the front of which is the head *d*, in which are the bearings for the reciprocating awl-bar *e* and the presser-foot bar *f*. Under the table in the plane of this head, is a frame, *g*, for the bearings of the reciprocating needle-bar *h* and cast-off-bar *i*, the needle, cast-off, and presser-foot being in connection with the thread-guide and feed mechanism, the devices to be relatively moved in the formation of the successive stitches, and the awl acting as a puncturing instrument in advance of the action of the needle, or to form the holes through which the needle-hook and thread-loop are to pass. *k* denotes the hook-needle, having its shank fastened in the needle-bar. The vertical movements of this bar are effected from a horizontal shaft, *l*, journaled in bearings below the plane of the work-supporting plate. This shaft *l* is the driving-shaft, and bears at its outer or rear end a fly-wheel, *m*, and its connection with the needle-bar to actuate the needle is as follows: To the needle-bar is fixed a block, *n*, that slides in a vertical slot in the frame *g*, and this slide-block projects from a plate, *o*, through which is cut a horizontal slot, in which latter slot traverses a slide, *p*, this slide being mounted on a pin, *q*.

The pin $q$ extends from a slide, $r$, working in a slot in the needle-lever $s$, in which slot it is made adjustable by a set-screw, $t$. The needle-lever is pivoted to a stud, (made adjustable with a screw and a nut,) and to the needle-lever is fixed a plate, $u$, having a curved slot, $v$, (as seen in Fig. 4,) in which works a roll on a crank-pin, $z$, projecting from a wheel or disk, $w$, on the shaft $l$, the rotations or rotative movements of the crank-pin imparting by these connections the requisite vertical movements to the needle.

The hook-needle is the ordinary hook-needle used in wax-thread sewing-machines, and at the hook-side of it is the ordinary cast-off $x$. The shank of this cast-off is fixed in the top of a bar, $i$, which slides in bearings in the frame $g$, the bar being kept from turning by suitable devices. The movements of the cast-off relatively to the movements of the needle are effected by means of a projection upon the needle-bar striking projections upon the cast-off-bar, there being shown for this purpose a collar, $a^2$, on the needle-bar, which, as it moves down, strikes a collar, $b^2$, on the cast-off bar, and as it moves up strikes a pin, $c^2$, extending through the cast-off bar, the cast-off remaining at rest by friction or frictional appliances, except when moved by the contact of the collars, or collar and pin, the needle and cast-off moving together, or as one, under such contact.

The feed of the work is also affected from the under shaft $l$, and the feeding arrangement shown is as follows: Under the table-plate is fixed a bearing, $d^2$, in which is a rod or slide, $e^2$, having extending from its inner end a bent pin, $f^2$, notched at its point. Projecting down from the slide is an arm, $s^2$, actuated by an arm, $i^2$, extending from a rocker-shaft, $k^2$, the end of another arm, $l^2$, extending from this shaft, being intermittingly struck by a projection from the shaft $l$, (or from a collar upon said shaft,) the depression of the arm $l^2$, thus effected, throwing forward the arm $i^2$ and the slide $e^2$, and bringing the notch at the end of the pin $f^2$ astride the thread, (the thread being then taut,) the pin then moving the thread and with it the work, the presser-foot being at such time above the work, and the points of both awl and needle free from or out of the work, or just after the needle-hook has drawn down the loop and while the needle still holds the loop. The slide is returned to its normal position by a spring, $m^2$.

The movements of the needle, cast-off, and feed mechanism (below the work-supporting plate) having been thus described, it remains to describe the method of effecting the requisite movements of the awl, presser-foot, and thread-guide, above the work-supporting plate. These devices, or the bars or stocks from which they project, are all located and have their movements in the head $d$. The movement of the needle is effected, not by a long bent lever connected with the driving-shaft, but by means of a shaft whose axis of rotative movement is parallel to the axis of rotative movement of the driving-shaft. The movements of the thread-guide are also thus effected, and so, likewise, are those of the presser-foot. In the drawing they are shown as so arranged as to be all actuated by one rocker-shaft, $n^2$, which is journaled in bearings connected with the goose-neck. This shaft receives its motions direct from the driving-shaft by means of an arm, $o^2$, extending from the shaft, jointed to an eccentric $p^2$ on the driving-shaft by a link, $q^2$, and its eccentric strap $r^2$. At the front end of this shaft is shown a disk, $s^2$, to which is jointed the upper end of a link, $t^2$, the lower end of which is jointed to the awl-bar $e$, the awl being reciprocated vertically by this connection and the rocking or reciprocating rotative movements of the rocker-shaft. In the periphery of the disk $s^2$ is cut a cam slot, $u^2$, into which enters a pin, $v^2$, projecting from an arm, $w^2$, at the top of a vertical shaft, $x^2$, journaled in the head and carrying at its lower end the thread-guide or thread-guiding arm, $y^2$, through an eye at the end of which passes the thread, the movements of the shaft causing the thread-guide to carry the thread into position at each rise of the needle, for the needle-hook to catch the thread as the needle descends. The presser-foot $a^3$ is at the foot of the presser-bar $f$, which bar slides vertically in the head $d$. Said bar is shown as having a projection, $c^3$, working in a vertical slot, $d^3$, in the plate $e^3$, at the front of the head $d$, (see Fig. 5.) One end of a spring, $f^3$, is fastened to the plate $e^3$, while the other end bears against the guide-piece $c^3$, and keeps the presser-foot $a^3$ in the position represented in Figs. 1 and 2. $s^3$ is a lifting-dog, the upper edge of which engages with a latch, $i^3$, pivoted at $k^3$ to the block $l^3$, and thus, as the disk is rocked, the block $l^3$, to which the presser-foot is fixed, and with it the presser-foot $a^3$, is lifted until the inclined portion $m^3$ of the latch $i^3$ comes into contact with the lower end of the screw $x^3$, when the latch is forced outward and disengaged from the lifting-dog $s^3$, and the shaft $f$ is carried down by the spring $f^3$, so as to bring the presser-foot $a^3$ into the position seen in Figs. 1 and 2, holding it firmly down onto the material during the time that the awl is making the hole and the needle is in the material, the presser-foot being raised the instant the needle has descended with the loop beneath the leather, so as to leave the leather free to be fed forward by the pin $f^2$ striking against the thread, as before explained. A spring, $o^3$, serves to press the latch $i^3$ up against the lifting-dog $s^3$.

I claim—

1. The shaft above the table, in combination with the shaft below the table, and with intermediate connecting devices operating, substantially as described, whereby the two shafts impart the respective movements to the awl and presser-foot above the table, and to the needle and cast-off below the table.

2. The shaft above the table and the presser-foot and thread-guide combined, substantially as described, whereby the shaft imparts motion, as described, to the presser-foot and thread-guide.

SHOE-MACHY. MANFG. CO.,
By H. E. TOWNSEND, *President.*

Witnesses:
FRANCIS GOULD,
M. W. FROTHINGHAM.